INVENTOR
Walter H. Korff

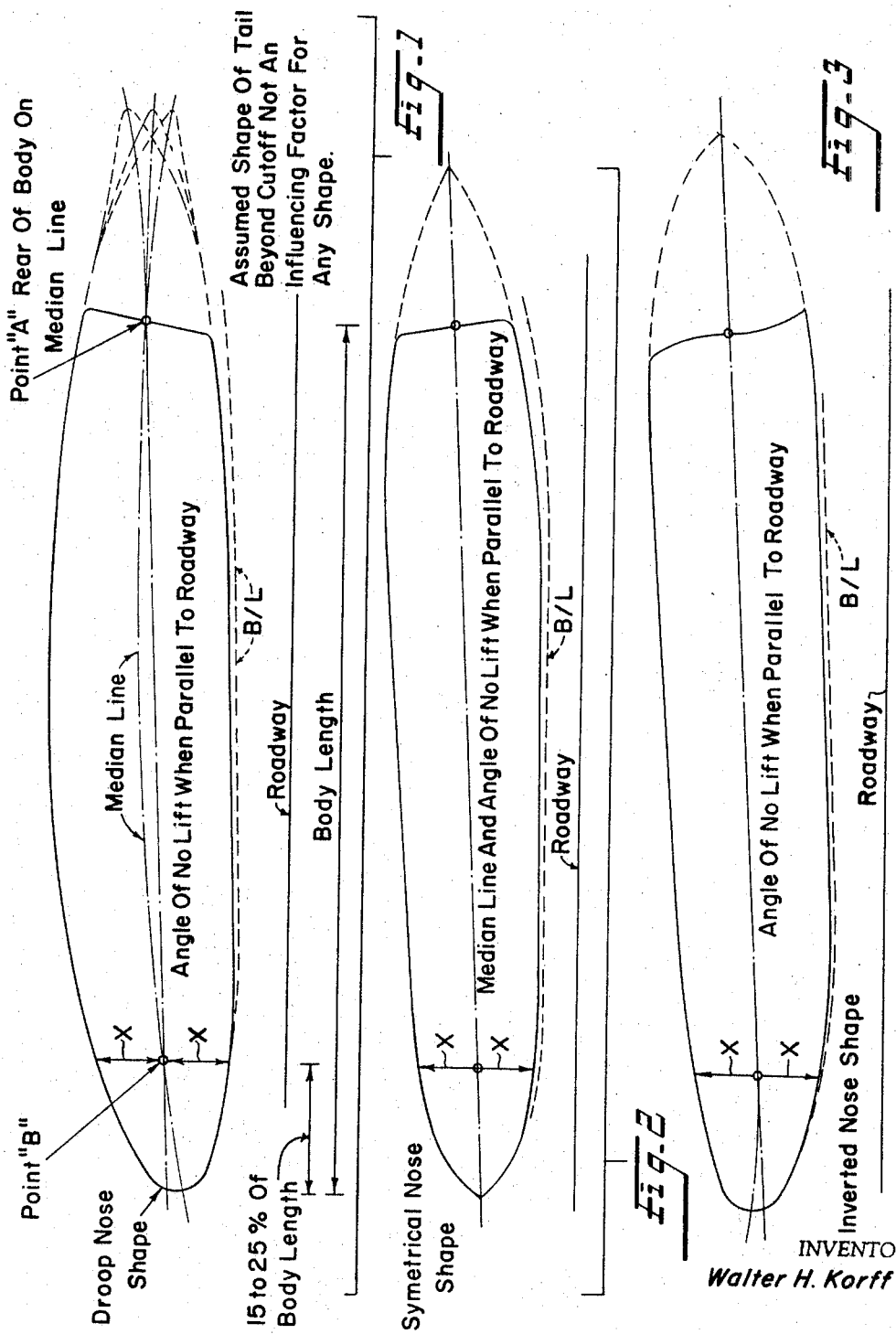

BY
ATTORNEYS

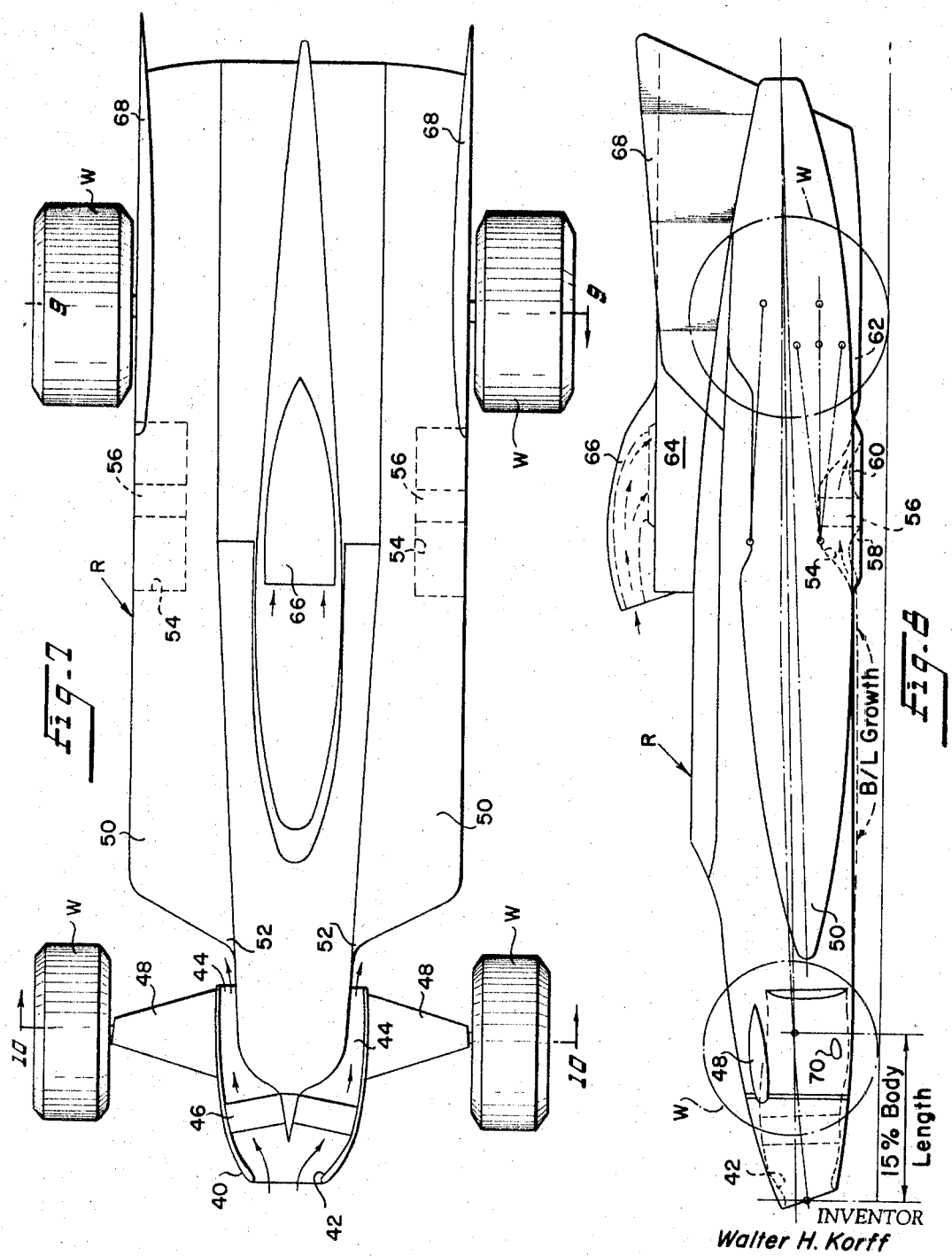

3,425,741
LAND VEHICLE HAVING MINIMUM AIR DRAG
Walter H. Korff, 449 N. Lamer, Burbank, Calif. 91506
Filed Nov. 4, 1966, Ser. No. 592,011
U.S. Cl. 296—1                                 16 Claims
Int. Cl. B64c 1/38, 21/00

ABSTRACT OF THE DISCLOSURE

A streamlined vehicle body having a no-lift line tilted at a slight negative angle for maintaining small downward and having a continuous bottom as well as top and side surfaces, the bottom surface having an upward taper to reduce boundary layer buildup, the nose and aft portions of the body being shaped to maintain strong evenly distributed air flow along all the body surfaces, specially to maintain strong air flow along the bottom surface of the vehicle.

---

This invention pertains to the reduction of drag on land vehicles and specifically to the means and method for controlling and directing the flow of air about the vehicle.

Many years ago, we learned that our cars are subjected to a great deal of stop and go short distance driving. Road planners and road builders have given us non-stop high speed driving on new expressways and freeways across the nation. Considerable time is still spent on stop and go driving but the mileage is rolling up on the high speed through-roads. We now have a lot more "go" with fewer stops. Today and even more so in the furture aerodynamic devices to improve air flow around the vehicle and thus reduce drag become increasingly important.

It is therefore an object of this invention to provide means for increasing the quietness of our automobiles.

Yet another object of this invention is to eliminate lift which adversely affects stability and braking control.

A further object of this invention is to provide means for substantially improving fuel economy without reduction in performance.

Still a further object of this invention is to provide means to improve acceleration in the passing ranges without additional engine power.

Another object of this invention is to provide a vehicle with a higher than present maximum speed for the same amount of horsepower in order to permit the vehicle to operate with less effort at cruising speed.

A further object of this invention is to enable the manufacturer to reduce the cost of the vehicle by permitting the use of a smaller, less powerful engine and power train without sacrificing efficiency or reliability.

A further object of this invention is to provide means for reducing skin friction and for accelerating boundary layer flow.

Another object of this invention is to provide high speed directional stability to automotive vehicles and the like.

Yet another object of this invention is to provide means for reducing interference drag on the underside of a vehicle.

These and other objects and advantages of this invention will appear in the following specification, reference being made to the appended drawings in which:

FIGURES 1, 2 and 3 are schematic views illustrating the median and lift lines;

FIGURE 7 is a top plan view of still another embodiment of this invention;

FIGURE 8 is a side elevation view of the vehicle illustrated in FIGURE 7;

Figure 9:
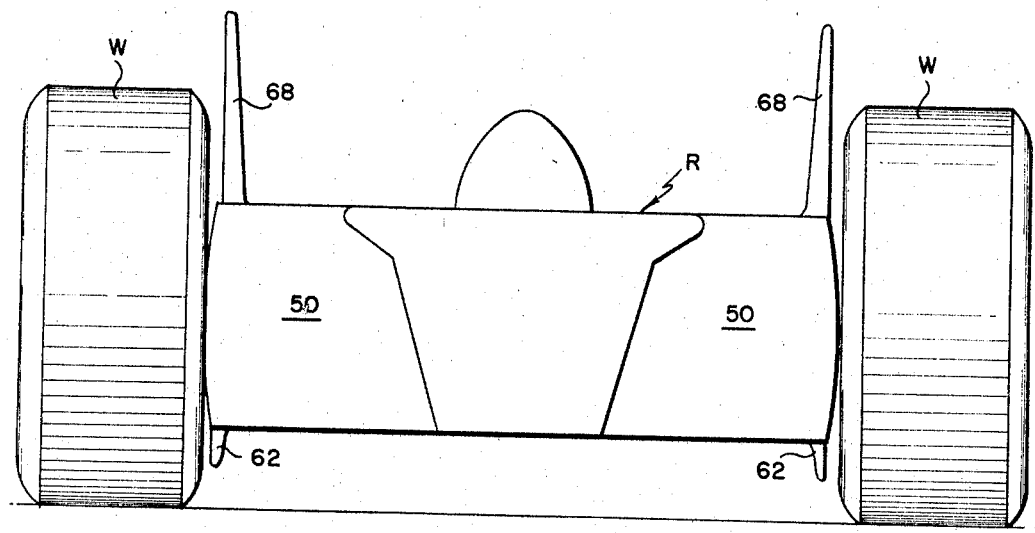
Figure 10:
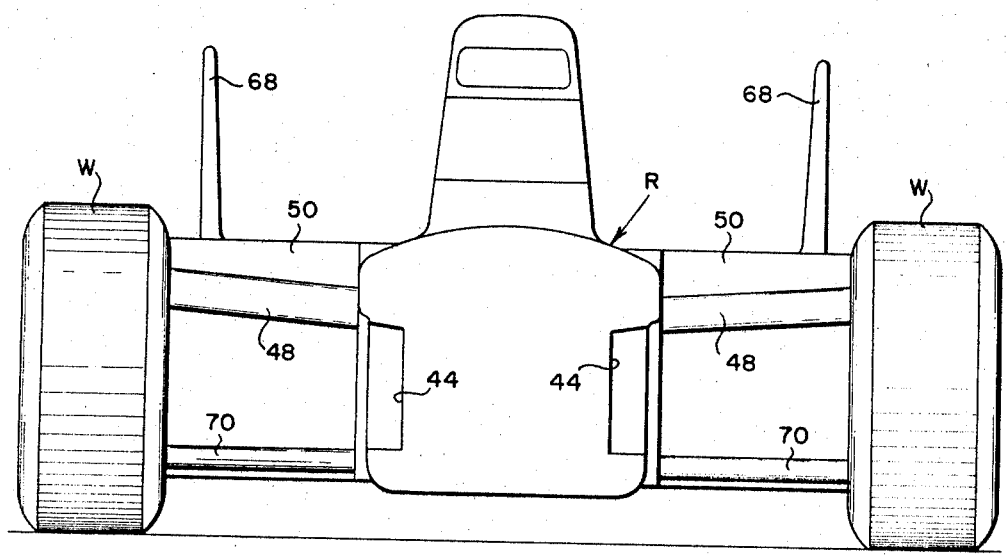
Figure 11:
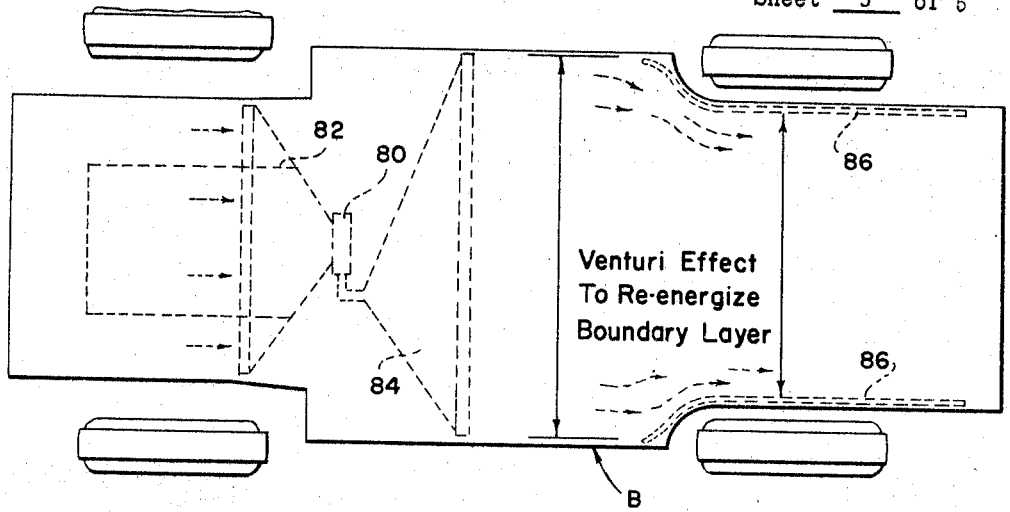
Figure 12:
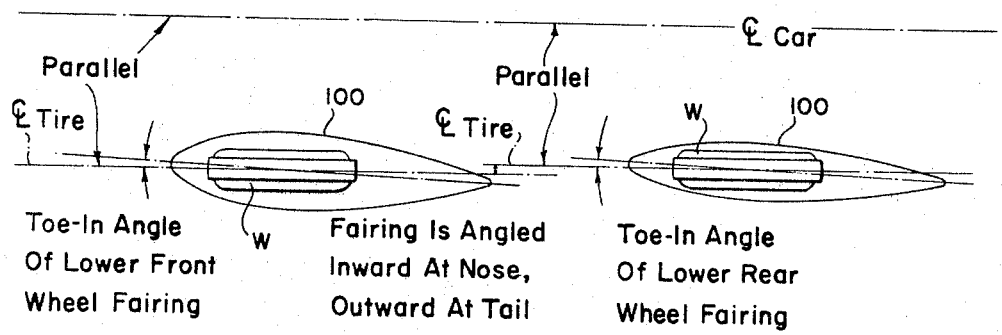

FIGURES 9 and 10 are cross sectional views taken on the lines 9—9 and 10—10 respectively of FIGURE 7 and viewed in the direction of the arrows;

FIGURE 11 is a fragmentary top plan view schematically illustrating air flow;

FIGURE 12 is a diagrammatic view illustrating a wheel and fairing arrangement.

Summary

This invention relates to vehicles having a no-lift line set at slight negative angle to download so as to maintain the vehicle on the surface thereby eliminating lift drag effects. Depending on the type of vehicle, the negative angle will vary somewhat from about $-1°$ to about $-5°$. Greater negative angles than indicated will produce adverse effects on speed, handling, etc. The invention also contemplates the redirection of air to the sides and to the underside of the vehicle to lower drag and obtain directional stability and the utilization of means for "fencing off" interferences in flow-pass air and for re-energizing the boundary layer of air in stagnant or weak areas.

The ideal shape of a vehicle would be one in which the air is directed around the nose and along the bottom, the top and the sides smoothly and equally without separation of air flow from the surfaces of the body. It has been shown from wind tunnel tests that air flow is weak between the underside and the ground surface and that it usually stagnates just ahead of the rear wheels and that radiator efficiency is reduced if down stream flow cannot be maintained. Choking effects between underside and the roadway turbulence from the wheels, tires, brakes, suspension, etc. can be corrected by use of an underside plate and the use of sealed ducting to spread air coming from the radiator system under the vehicle in a narrow but wide manner.

It has been found that as long as underbody air flow is inadequate, surface vehicles will have unbalanced aerodynamic forces such as lift and instability in pitch as well as yaw that is difficult to deal with.

The concepts and principles of this invention deal more specifically with the means for energizing and creating adequate air flow along the underside of the surface of the vehicle all the way to the rear of the vehicle including use of aids to avoid turbulence such as fences, fins, vanes, strakes, fairings and/or semifairings in addition to a smooth surface. It has been further found that the establishment of sufficient slope to the underside compensates for the growth of the boundary layer as does also means for energizing the boundary layer and adjacent air streams such as vanes or slots at the nose underside, and the general shape of the nose underside to create a venturi effect.

It has further been found that the use of fairings and the like in critical areas rearward of the front of the vehicle aid in re-energizing the underside boundary layer. Such means as ram air brought in from the sides or top or by means of a pump aid in the control of the boundary layer as does also the utilization of a suction means.

Configuration of the underside aft lip of the nose so as to direct the air flow uniformly has been found to aid in drag reduction. The location of the fuel tanks particularly on racing vehicles on the sides in a manner to cause a negative lift further enhances stabilization on the vehicle. By utilizing the features herein set out, drag reduction in automobiles, trains, motorcycles and other types of land vehicles can be reduced as much as 50% from present design.

*No-lift line FIGURES 1–3*

With variations in body styling, it is most important to determine the no-lift line with respect to the vehicle and the land surface on which it travels. The determination of the no-lift line is illustrated in FIGURES 1 through 3 by drawing the basic side elevation body design of the vehicle as determined primarily by the nose, hood and bottom lines and extending these lines rearwardly to form a basic body shape. The assumed shape of the tail beyond the rear of the vehicle is not a significant drag influencing factor. Once the basic body shape has been constructed, a median line is drawn and point A is marked off on the median line where the rear of the actual body design ends as illustrated. After the marking off of point A, point B is marked off at a point about 15 to 25 percent of the body length back from the body nose of the vehicle and at a position on the median line midway between the hood line and the bottom line. It is preferable that point B be positioned about 20 percent of the body length back from the nose of the vehicle. Upon the determination of points A and B, a straight line is then drawn between these two points which line is the no-lift line of the vehicle. Different vehicle designs will require some study to determine the basic cigar shape of the vehicle in order to approximate the no-lift line as closely as possible.

It will be noted in FIGURES 1 through 3 that B/L line, which indicates the boundary layer, gradually increases with the length of the vehicle. FIGURE 1 shows a droop nose shape to the forward portion of the vehicle whereas FIGURE 2 shows a symetrical nose shape and FIGURE 3 shows an inverted nose shape.

Figure 4:
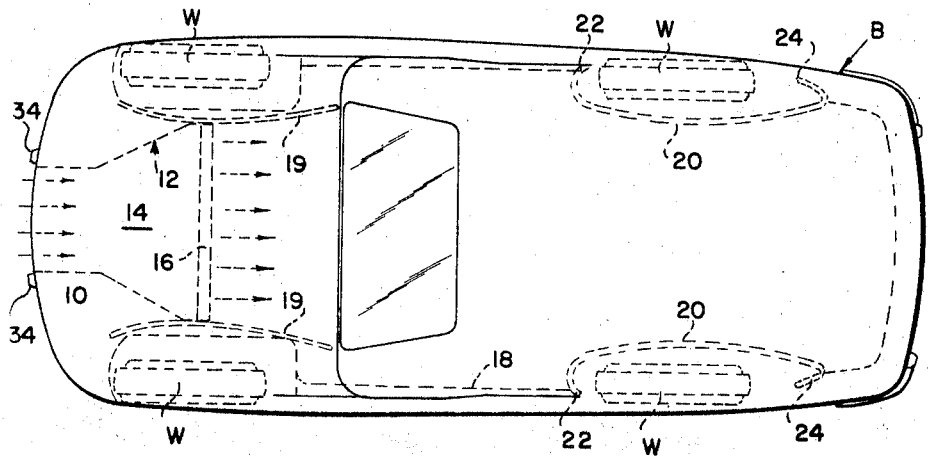
FIGURE 4 is a top plan view illustrating that embodiment of this invention.
Figure 6:
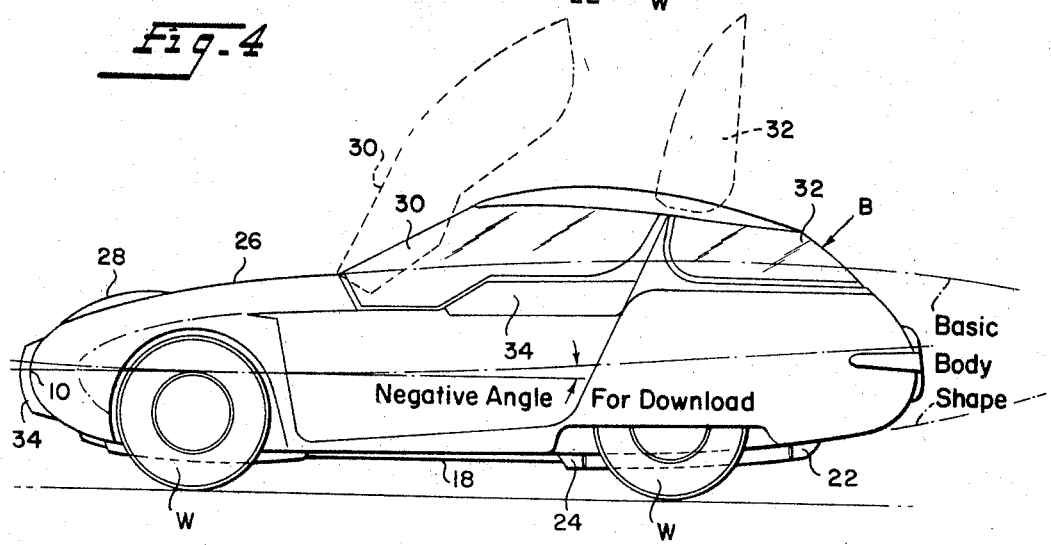
FIGURE 6 is a side elevation view of the vehicle illustrated in FIGURES 4 and 5.
Figure 5:
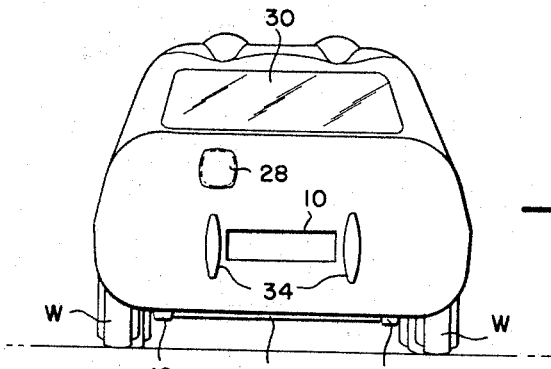
FIGURE 5 is a front elevation illustrating the invention disclosed in FIGURE 4.

*FIGURES 4, 5 and 6*

FIGURES 4, 5 and 6 illustrate a conventional vehicle design utilizing some of the means of this invention for reducing drag and increasing the dynamic stability and download. The body B includes a front air inlet 10 best illustrated in FIGURE 5. It is to be noted that the air inlet also illustrated in FIGURE 4 is relatively narrow in height and width and flares outwardly as at 12. The engine and radiator are not shown; nevertheless, the radiator would be placed in the ducting 14 so as to be sealed. The ducting 14 is brought downwardly to the bottom of the car in a narrow broad outlet 16 for distributing the air in a fan-like manner on the underside of the vehicle. An underpan 18 is provided on the underside of the vehicle for reducing drag effects. As noted in the figures, the nose of the vehicle tends to curve rearwardly both top and bottom and sideways in order to get the air distributed evenly along the sides and top and bottom surfaces. A venturi effect is created between the ground surface and the nose as generally illustrated in FIGURE 6. This venturi energizes the air initially beneath the forward portion of the bottom of the vehicle. The venturi effect is increased by means of the fencing or fairings 19 about the front wheels W of the vehicle. The fencing at the front wheels may require extension in some cases all the way to the rear fences or fairings 20 similar to an underside tunnel or channel. In the figures, the fencing 20 is brought about to form a semi-enclosure about the rear wheels W. Fencing or fairing 20 shows a curved rearward portion 22 and a curved forward portion 24. These curved portions are utilized to reduce drag effect on the vehicle. It will be noted that a second venturi effect is created about the rear wheels by the fairing 20 to re-energize the boundary layer.

Because of the general slope configuration of the hood 26, a local bump 28 is formed to provide clearance for the engine (not shown).

It will be noted in FIGURE 6 that the no-lift line of the body, the body shape lines, and the nose median line are over drawn on the basic car design to illustrate the teachings of this invention.

It is to be noted that the front wheels are set farther apart than the rear wheels in order to enhance stream lining of the body from front to rear. The body B illustrated shows a pivoting canopy 30 and a pivoting deck lid 32. It is also to be noted that the door is provided with a flush flap tilt-up 34 to provide for exposure of the arm for signaling purposes. Bumpers 35 protect the air inlet 10. Increased smoothness of the body including elimination of rain gutters, and eliminating as much as possible various protuberances also increase streamlining of the vehicle.

It is to be noted in FIGURE 6 that the underside of the body at the rear wheels W is higher than the underside of the body at the front wheels W.

*FIGURES 7, 8, 9, 10—Racing construction*

In FIGURES 7 through 10, the vehicle illustrated is a racer. The body R is illustrated in FIGURE 8 with the no-lift line, the median line, and the line for the angle of attack of the fuel tanks. The boundary layer growth lines are also shown. The nose 40 of the vehicle includes an air scoop 42 provided with air ducts 44 which direct the air along the sides of the body R. The water radiator 46 is located in the nose 44. Fairings 48 are provided about the suspension (not shown) for the wheels W. It is to be noted that fuel tanks 50 are tapered to come to a blunt point towards the forward end of the vehicle and to merge into the body R as at 52. The fuel tanks 50 are provided with recesses 54 for mounting of oil coolers 56. Scoops 58 bring air into the oil coolers 56 and exhaust the air through the restrictor 60 slightly in advance of the fencing 62. This arrangement re-energizes the boundary layer growth B/L line. It is to be noted that the fuel tanks have a slight negative angle of attack varying slightly from the angle of attack of the no-lift line. A blower pump (not shown) is housed behind the cockpit in the housing 64 and air entering in the engine air inlet 66 is directed by the blower (not shown) over the engine (not shown). As best shown in FIGURES 8 through 10, upper fencing or fins 68 are provided for further stabilization purposes at sigh speeds.

A small fairing member for the front wheel suspension 70 is shown located beneath the fairing 48. The small suspension member also has a negative angle of attack.

It is important to note that the fuel tank arrangement of the racer body R is unique in that for the first time, the fuel tanks have been designed to provide download on the vehicle. This is particularly beneficial at high speeds.

It should be noted that the front of the vehicle is set lower to the ground than the rear of the vehicle for reasons hereberfore mentioned.

It should be noted that the fencing 62 which is rearward of the oil coolers 56 provides a venturi effect for re-energizing the boundary layer air.

*FIGURE 11.—Pumping means and evacuating means*

In FIGURE 11, the body B is schematically shown to illustrate how a pump 80 will suck in air by means of ducting 82 from the front part of the vehicle body B and blow air through ducting 84 to the rear portion of the under body of the vehicle so as to energize the boundary layer. It will be obvious that the ducting 82 may extend to any surface of the vehicle whether it be top, bottom or side and that the top 80 may draw a substantial suction as necessary to eliminate turbulence in certain areas. Similarly, the top 80 may be used to direct air through the ducting 84 to whatever locale of the body is necessary for energizing the boundary layer.

In FIGURE 11 it will be noted that the fairing 86 produces a venturi effect in a manner similar to the vehicles heretofore described for re-energizing the boundary layer.

*FIGURE 12.—Fairing for complete wheel housing with toe-in angle*

FIGURE 12 schematically illustrates how fairings or fencing 100 for high speed vehicles in which the fairings 100 are toed-in for purposes of eliminating "choking" between the left and right wheel fairings. The air flows nearly on a straight line between the the noses of the fairings and a minimum venturi effect is desirable if the air speed approaches the speed of sound along the underside. The toe-in arrangement tends to direct most of the air ahead of the fairing to the outside of the vehicle and thus to eliminate interference. It is to be noted that the front wheels W and the rear wheels W are offset from each other so that the rear wheels W are closer together than the front wheels for stream-lining purposes as heretofore mentioned. In some vehicle constructions, it may be desirable to have the fairings 100 "toe-out" where acceleration of the boundary layer is required and a more positive venturi effect is desired. This effect would be particularly desirable for odd-shaped vehicles in which difficulty is experienced in getting energization of boundary layer.

While this invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

What is claimed is:

1. A land vehicle which provides for even, low drag air flow along its body surfaces, comprising:
    (a) a vehicle body supported between a pair of front and a pair of rear wheels, and having a wide nose and stub rear end, which both are approximately the same width as the central portion of the body,
    (b) the bottom as well as to top and side surfaces of said vehicle body being continuous from nose to rear,
    (c) the bottom of said body being disposed close to the ground and being flat in both the longitudinal and transverse directions to present a smooth unimpeded surface for the passing air stream,
    (d) said bottom surface also having a slightly upward taper extending longitudinally from behind the pair of front wheels to the rear of the vehicle to compensate for growth of boundary layer along the underside of the vehicle body,
    (e) the vehicle body having a slightly downward inclination toward the front end, the magnitude of which is determined by the no-lift line, the angular inclination of this line being a negative angle of from one of five degrees with the road surface,
    (f) said no-lift line being determined by two points on an imaginary median line through the body, one of said points being at the rear of the vehicle body, and the other point located 15 to 25 percent of the body length rearward of the front of the nose of the vehicle,
    (g) the bottom surface at the rear of the body being substantially below the no-lift line, and
    (h) said nose having curved top and bottom sides, so that air is distributed evenly along the vehicle body surface, the curved bottom side of said nose forming part of said bottom surface forward of the front wheels, and acting to energize the boundary layer along the bottom surface.

2. The land vehicle as set forth in claim 1, and having:
    (a) means on the bottom surface of said vehicle for energizing the boundary of air adjacent the rear wheel, said means including fencing means.

3. A land vehicle as set forth in claim 1, and having:
    (a) means for directing a substantial amount of air along the sides of the vehicle.

4. The land vehicle as set forth in claim 1 and having:
    (a) means for re-energizing air flow along the underside of said vehicle at a point adjacent the rear wheels.

5. A land vehicle as set forth in claim 1, and having:
    (a) means for re-energizing along the bottom surface of said vehicle, said means forming a venturi adjacent the rear wheels.

6. A land vehicle as set forth in claim 5 and wherein:
    (a) fencing means adjacent each wheel of the pair of rear wheels forms said re-energizing venturi.

7. A land vehicle as set forth in claim 1, and having:
    (a) energizing air flow means for the vehicle bottom surface which includes a ducted radiator system having an exhaust for introducing ducted exhaust air in a wide narrow stream as part of the downstream air flow along said surface.

8. A land vehicle as set forth in claim 7, and wherein:
    (a) said radiator system includes a relatively small intake duct opening, and
    (b) an intake duct expanding gradually to encompass said radiator in a sealed condition.

9. A land vehicle as set forth in claim 1, and having:
    (a) venturi creating means on the bottom surface of said vehicle which includes a plurality of vanes and slots.

10. A land vehicle as set forth in claim 1, and having:
    (a) means for re-energizing air flow along the bottom surface of the vehicle which includes ram air means which has an outlet adjacent said rear wheels in a narrow wide stream.

11. A land vehicle as set forth in claim 1, and having:
    (a) a pair of fuel tanks located on either side of said vehicle, and,
    (b) said fuel tanks having a negative angle of attack so as to provide a download on said vehicle.

12. A land vehicle as set forth in claim 11, and wherein:
    (a) said fuel tanks taper gradually from rear to front.

13. A land vehicle as set forth in claim 1, and having:
    (a) an oil cooler,
    (b) said oil cooler including means for directing boundary layer air across said cooler and thence to the bottom surface to re-energize the boundary layer air along said bottom surface.

14. A land vehicle as set forth in claim 1, and having:
    (a) fencing surrounding the wheels to said vehicle which would "toe-in" to cause a portion of the air flow along said bottom surface to be directed outwardly.

15. The land vehicle as set forth in claim 1, and wherein:

(a) said vehicle body has a slight taper toward the rear thereof in top plan view.

16. A land vehicle as set forth in claim 1, and having:
(a) wheel suspension angled at a slight negative angle to create download.

References Cited

UNITED STATES PATENTS

| | | | |
|---|---|---|---|
| 2,071,592 | 2/1937 | Thompson | 296—1 |
| 2,128,686 | 8/1938 | Andrean | 296—1 |
| 2,955,869 | 10/1960 | Blaser | 296—1 |
| 2,488,991 | 11/1949 | Stalker | 244—130 X |
| 2,694,357 | 11/1954 | Lee | 244—130 X |
| 2,037,942 | 4/1936 | Stalker | 144—130 X |
| 2,853,852 | 9/1958 | Bodine | 244—130 X |
| 3,066,893 | 12/1962 | Mercier | 244—130 X |

FOREIGN PATENTS

| | | |
|---|---|---|
| 421,880 | 11/1925 | Germany. |
| 762,588 | 8/1952 | Germany. |
| 767,556 | 11/1952 | Germany. |
| 463,620 | 3/1937 | Great Britain. |

PHILIP GOODMAN, *Primary Examiner.*

U.S. Cl. X. R.

244—130